No. 718,246. PATENTED JAN. 13, 1903.
F. M. GIDEON.
TURPENTINE STILL.
APPLICATION FILED APR. 12, 1902.
NO MODEL.
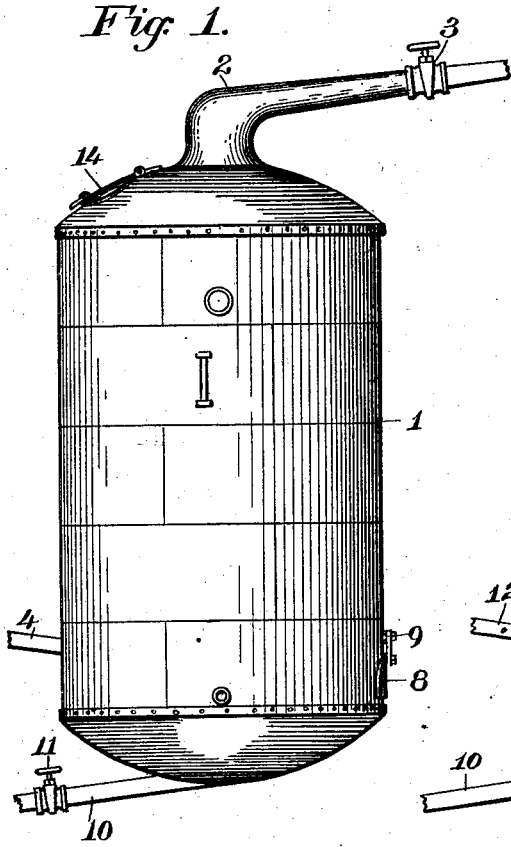
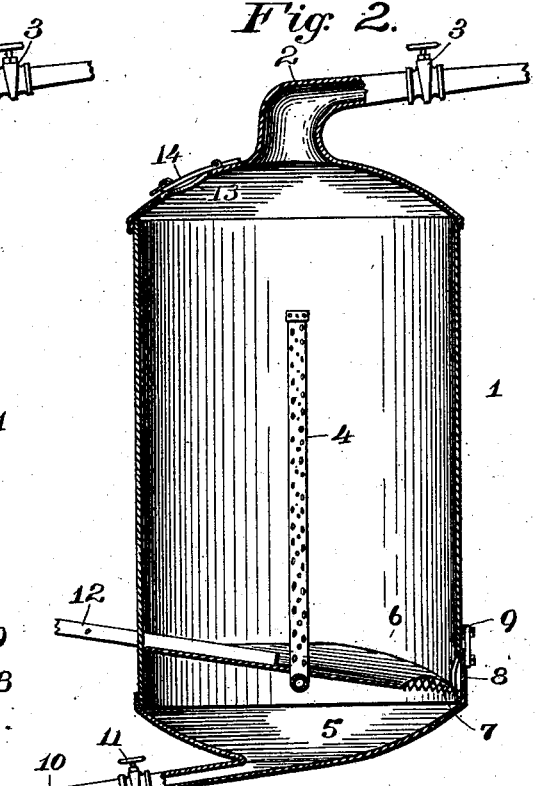
Fig. 1. Fig. 2. Fig. 3. Fig. 4.
WITNESSES:
Percy C. Bowen
G. A. Brewton
INVENTOR
F. M. Gideon
BY
Attorney

UNITED STATES PATENT OFFICE.

FRANCIS M. GIDEON, OF BALLSTON, VIRGINIA.

TURPENTINE-STILL.

SPECIFICATION forming part of Letters Patent No. 718,246, dated January 13, 1903.

Application filed April 12, 1902. Serial No. 102,617. (No model.)

*To all whom it may concern:*

Be it known that I, FRANCIS M. GIDEON, a citizen of the United States, residing at Ballston, in the county of Alexandria, Virginia, have invented certain new and useful Improvements in Turpentine-Stills; and I do hereby declare the following to be a full, clear, and exact description of the invention, such as will enable others skilled in the art to which it appertains to make and use the same.

My invention relates to turpentine stills or digesters. Its object is to provide a still especially applicable to the distillation of turpentine and the production of rosin and other products by the action of steam on chips or prepared wood.

To this end it comprises, essentially, a still or digester, means for introducing steam, means for collecting the products, and means for blowing off the residue of the charge.

In the accompanying drawings, Figure 1 is a side elevation; Fig. 2, a vertical section; Fig. 3, a horizontal section, and Fig. 4 a vertical section at right angles to the section of Fig. 2.

1 represents the body of the still or digester, 2 the neck, and 3 a valve governing the discharge of the vapors of distillation.

4 is a steam-pipe leading into the still and turned up at right angles, the part within the still being perforated.

5 is the bottom of the still; 6, a conical or concaved false bottom, the form especially adapted to carry out the functions of my apparatus having an inclined bottom. This form may be described as one formed by cutting the surface of half a cone by a cylindrical surface, the axis of the conical surface and of the cylindrical surface being at right angles to each other and the surfaces being symmetrically disposed toward each other. It is secured a short distance above the bottom in any suitable manner and is to receive and maintain the charge during the process of distillation.

7 is a wire mesh closing an opening at one end or at the bottom of the incline of the false bottom 6.

8 is a valve closing a port in the side of the still, and 9 is a lever or handle attached to the valve to operate it.

10 is the discharge-pipe for the crude rosin, and 11 is a valve governing its discharge from the bottom 5.

12 is a steam-blow-off pipe leading into the still and preferably, as shown, lying in the floor of the false bottom 6.

13 is a manhole or the feed-opening, which is guarded by a closure 14.

Preceding the operation of distillation the pine log, slab, or other piece of wood is run through a chipper or otherwise reduced to chips or shavings of desired size. The material is then carried, preferably by a direct chain, suction, or similar apparatus, through the opening 13 into the still until the charge is complete, resting on the false bottom 6. When the charge is complete and all the valves except the valve 3, which is opened, are closed, steam is turned on. As the process proceeds the rosin drips through the screen 7 to the bottom 5, ready to be removed, the vapors of distillation passing off through the neck 2 and being saved in the usual manner. When the distillation is complete, steam is turned off from the pipe 4, valve 3 is closed, valve 8 is opened, steam is turned on through the blow-off pipe 12, and the exhausted charge is blown off, being led away by a pipe or chute and disposed of as may be desired.

Having fully described my invention, what I claim is—

In a turpentine or similar still, the combination with the body of the still, of a perforated steam-pipe within the still, a false bottom substantially in the form of half a cone cut by a cylindrical surface, the axes of the conical surface and of the cylindrical surface being at right angles to each other and the surfaces being symmetrically disposed toward each other, and having a screened opening to permit the passage of the product of distillation, a discharge-port and a blow-off pipe to remove the exhausted charge.

In testimony whereof I affix my signature in presence of two witnesses.

FRANCIS M. GIDEON.

Witnesses:
W. O. BUTLER,
BUELL COOK.